Jan. 29, 1952 J. P. BURKE 2,583,813
MAT CONTROL FOR DOOR OPENING MECHANISMS
Filed Sept. 28, 1950 2 SHEETS—SHEET 1
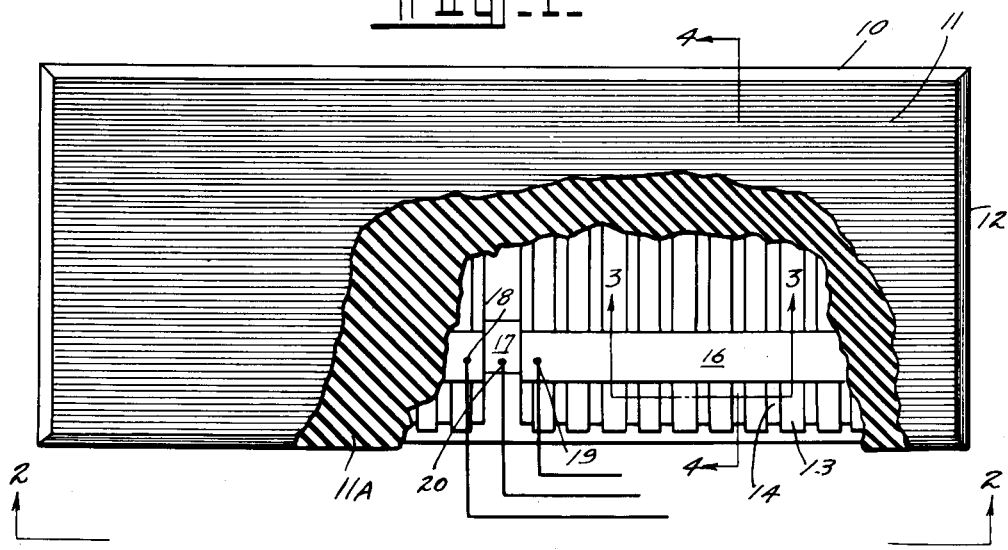
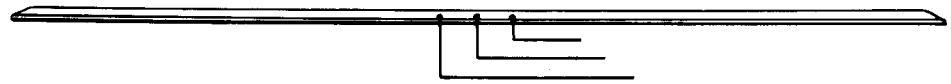
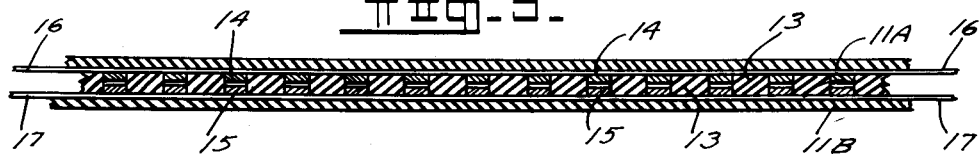
INVENTOR.
James P. Burke.
BY
W. B. Harpman
ATTORNEY.

Jan. 29, 1952  J. P. BURKE  2,583,813
MAT CONTROL FOR DOOR OPENING MECHANISMS
Filed Sept. 28, 1950  2 SHEETS—SHEET 2
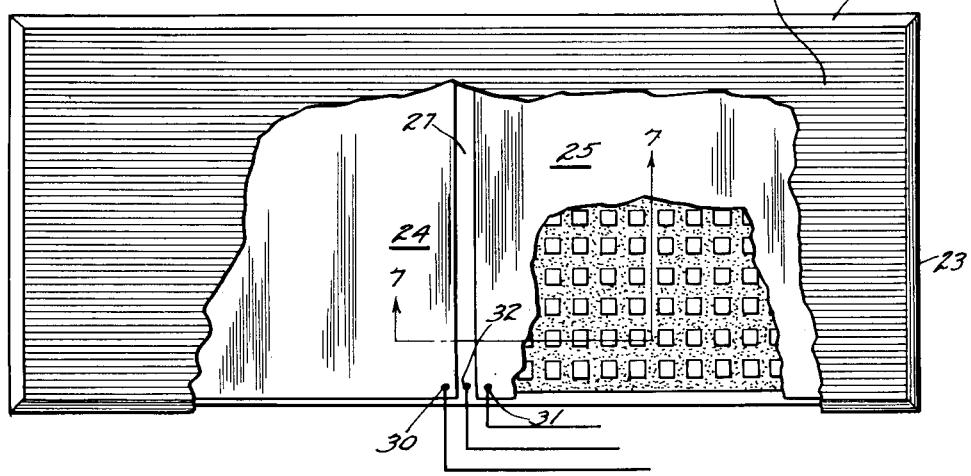
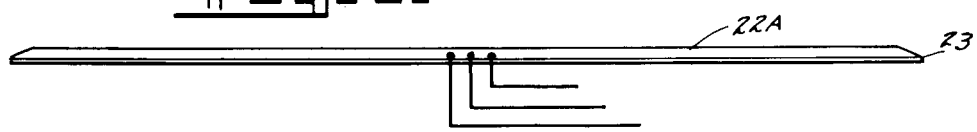
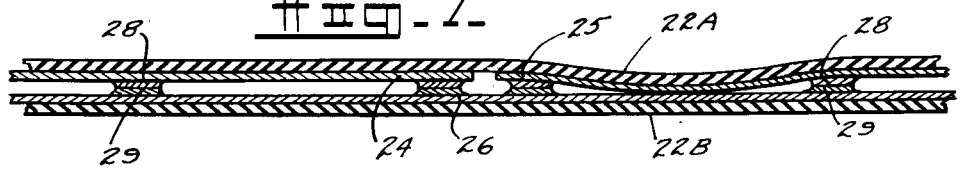
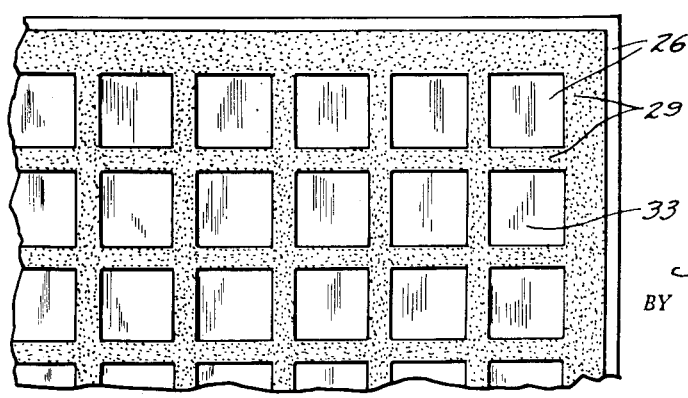
INVENTOR.
James P. Burke.
BY
ATTORNEY.

Patented Jan. 29, 1952

2,583,813

UNITED STATES PATENT OFFICE 2,583,813

MAT CONTROL FOR DOOR OPENING MECHANISMS

James P. Burke, Poland, Ohio, assignor to Murray M. Fibus and Jerome Marcus, both of Youngstown, Ohio Application September 28, 1950, Serial No. 187,232

2 Claims. (Cl. 200—86)

1

This invention relates generally to automatic door opening mechanisms and more particularly to a mat-type of electrical control therefor.

The principal object of the invention is the provision of a mat-type electrical control for a door opening mechanism.

A further object of the invention is the provision of a combination door mat and electrical control means for a door opening mechanism.

A still further object of the invention is the provision of a floor mat of resilient material incorporating spaced flexible electrical control means therein.

The mat control for door opening mechanisms disclosed herein comprises an improvement in the art and particularly in view of the construction disclosed in my co-pending patent application Serial No. 81,562, now abandoned, on Electrical Control for Door Opening Mechanisms.

The present disclosure relates to a construction which is capable of manufacture at lower cost than comparable constructions heretofore known in the art and results in a construction which is more flexible in use thereby contributing to the utility of the device in operation. Those skilled in the art will recognize that mat controls for door opening mechanisms of the type disclosed herein must be capable of being employed on various floor surfaces adjacent doorways and the like and which floor surfaces are often irregular as to surface contour. Mats heretofore known in the art have been incapable of use under such conditions and require rebuilding of a suitable floor area for their reception. The mat in the present disclosure is capable of use on any supporting surface whether it is of irregular surface contour or not.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of a mat formed

2 in accordance with the invention with parts broken away and illustrating the interior construction thereof.

Figure 2 is a side view of the mat shown in Figure 1.

Figure 3 is an enlarged longitudinal section taken on line 3—3 of Figure 1.

Figure 4 is an enlarged transverse section on line 4—4 of Figure 1.

Figure 5 is a top plan view of a modified form of mat control.

Figure 6 is a side view thereof.

Figure 7 is an enlarged transverse cross section taken on line 7—7 of Figure 1.

Figure 8 is a top plan view of one of the component parts of the modified form of mat control shown in Figures 5, 6 and 7.

By referring to the drawings and Figures 1, 2, 3 and 4 in particular it will be seen that a mat control for door opening mechanisms is disclosed and comprises a generally rectangular flat body 10 comprising an envelope 11 of resilient, rubber-like material forming upper and lower layers 11A and 11B, respectively, as best seen in Figures 3 and 4 of the drawings and sealed at their edges as indicated by the numeral 12. Within the envelope 11 there is disposed a plurality of transversely positioned sponge rubber strips 13 of a uniform height and length spaced with respect to one another and serving to space the upper and lower layers 11A of the envelope 11 vertically with respect to one another. The strips 13 extend parallel with each other substantially the full distance between opposite marginal portions of the upper and lower layers 11A, 11B of the envelope and said strips are spaced from each other throughout the entire length thereof.

A plurality of transversely extending, thin metal contact strips 14 are secured to the bottom of the upper layer 11A in spaced relation to one another and between the sponge rubber strips 13 heretofore referred to. A plurality of secondary thin metal contact strips 15 are secured to the upper surface of the lower layer 11B of the envelope 11 in spaced relation to one another and between the sponge rubber strips 13 and immediately beneath the plurality of contact strips 14 heretofore referred to and in normally spaced relation with respect thereto. The contact strips 14 and 15 extend substantially the full distance between opposite marginal portions of the upper and lower layers 11A, 11B of the envelope 11.

Those skilled in the art will readily see that the contact strips 14 and 15 are normally maintained in vertically spaced relationship by the sponge rubber strips 13 which have a different height than the combined height of the contact strips 14 and 15 and thereby support the same in normal vertically spaced relation. Those skilled in the art will also see that at such time as the upper layer 11A of the mat is depressed at least one of the contact strips 14 will be moved downwardly into contact with the secondary contact strips 15 immediately therebeneath thus closing an electrical circuit through the strips.

Conductors 16 and 17 (which are preferably thin metal strips running at right angles to the transverse direction of the contact strips 14 and 15 are secured to the contact strips 14 and 15 and to terminals on the exterior of the mat so that electrical connection wires may be led to the device to be controlled. It will occur to those skilled in the art that the construction thus disclosed is extremely simple and efficient as compared with the cumbersome and expensive mat controls heretofore known in the art.

The assembly of the mat disclosed herein is relatively easy as the layers of contact strips 14 are secured by suitable means to the one side of the layer 11A of the envelope 11 and the strips 15 are secured to the opposite side of the layer 11B of the envelope 11 so that they are in oppositely disposed relation to one another. The sponge rubber strips are then secured to one or both of the layers 11A and 11B as by suitable adhesives and the envelope sealed about its periphery which results in a mat control having excellent electrical characteristics and the desired sensitivity to pressure contact on any portion of its surface and at the same time so formed that it may be rolled up in either direction and unrolled and placed in operation on an uneven floor surface and over a threshold or the like.

The construction of the mat is thus considerably improved with respect to the disclosure in my aforementioned co-pending patent application in which relatively large conductor sheets were believed necessary to make the mat operative, and which sheets added to the weight and cost of the mat and resulted in its relative rigidity which is an undesirable characteristic.

By referring to Figure 1 of the drawings it will observed that the mat is formed in two sections divided by a transverse line 18 and that the contact strips 14 of each section are wired to individual terminals 19 and 20 while the contact strips 15 are wired to a common terminal 21. The mat may thus be positioned with the transverse center line 18 beneath the door to be controlled and suitable electrical circuits utilized whereby one portion of the mat is used to cause the door to swing in one direction and the other portion of the mat is used to hold the door in open position until a person walking longitudinally of the mat has crossed its complete surface. Such an arrangement is shown in my aforementioned co-pending patent application.

Having described the preferred form of the invention, the modified form as disclosed in Figures 5, 6, 7 and 8 will be seen to comprise a similar mat control wherein an envelope 22 including top and bottom layers 22A and 22B is formed and sealed at its peripheral edges 23 and encloses contact means comprising a pair of top sheets 24 and 25 and a bottom sheet 26.

The top sheets 24 and 25 are spaced with respect to one another by a transverse center line 27 and they are also spaced vertically with respect to the bottom contact sheet 26 by a plurality of vertically registering painted stripes 28 and 29 of dielectric material such as paint, latex or the like. The total thickness of the vertically registering painted stripes 28 and 29 are sufficient to normally space the upper contact sheets 24 and 25 with respect to the lower contact sheet 26.

At such time as the upper layer 22A of the envelope 22 is depressed, as shown in Figure 7 of the drawings, the upper contact sheets 25 will flex sufficiently to contact the lower contact sheet 26 and thereby establish an electrical contact through the device. Suitable terminals 30 and 31 are connected with the upper contact sheets 24 and 25 and a terminal 32 is connected with the lower contact sheet 26 so that electrical connection wires may be extended to the device to be controlled.

In Figure 8 of the drawings a top plan view of the contact sheet 26 may be seen and it will be observed that the painted stripes 29 may be formed in any desired pattern such as the square criss-cross pattern shown and results in the formation of a plurality of square open contact spaces 33 therebetween. It will thus be seen that in the assembled mat the painted stripes 28 and 29 lie in vertical registry with one another and that if the pattern as illustrated in Figure 8 is altered on the lower contact sheet 26, a pattern for vertical registry should be applied to the upper contact sheets 24 and 25.

It will thus be seen that two forms of the invention have been disclosed, it being observed that in the modified form of the invention just described and illustrated in Figures 5 through 8 of the drawings, the flexibility of the mat is less than that of the preferred form of the invention illustrated in Figures 1 through 4 of the drawings. It will be obvious to those skilled in the art that in the modified form of the invention the contact sheets 24, 25 and 26 may be of very thin conductive material to keep down the over all weight of the mat.

It will thus be seen that the several objects of the invention have been met by the mat control for door opening mechanisms disclosed herein.

Having thus described my invention, what I claim is:

1. A mat control for door operating mechanism comprising an enclosing envelope including an upper and a lower layer each of flexible material, a plurality of elongated strips of resilient deformable insulating material positioned in parallel relation with each other between said upper and lower layers and yieldingly spacing said layers vertically with respect to one another, said strips of deformable insulating material each extending substantially the full distance between opposite marginal portions of said layers and being laterally spaced from each other throughout the entire length thereof, a plurality of upper electrically connected, thin metal contact strips secured to the lower face of the uppermost layer of the envelope parallel with and between said strips of insulating material, and a plurality of lower electrically connected thin metal contact strips secured to the upper surface of the lowermost layer of the envelope between said strips of insulating material, said upper and lower contact strips each extending substantially the full distance between opposite marginal portions of said layers, and the upper and lower contact strips normally lying in vertical spaced alignment and being engageable upon deformation of said deformable resilient insulating strips and one of the layers of the envelope.

2. The mat control set forth in claim 1 and wherein the deformable strips are formed of sponge rubber.

JAMES P. BURKE.

REFERENCES CITED

The following references are of record in the file of this patent:

UNITED STATES PATENTS

| Number | Name | Date |
|---|---|---|
| 1,915,292 | Conklin | June 27, 1933 |
| 2,067,336 | Paver | Jan. 12, 1937 |

FOREIGN PATENTS

| Number | Country | Date |
|---|---|---|
| 270,172 | Great Britain | May 5, 1927 |
| 342,157 | Great Britain | Jan. 29, 1931 |